United States Patent [19]

Kahn

[11] 4,227,052
[45] Oct. 7, 1980

[54] METHOD AND MEANS FOR REDUCING FALSE ALARM RATES IN SECURITY SYSTEMS

[76] Inventor: Leonard R. Kahn, 70 N. Grove St., Freeport, N.Y. 11520

[21] Appl. No.: 907,398

[22] Filed: May 18, 1978

[51] Int. Cl.³ .......................................... H04M 11/04
[52] U.S. Cl. ................................................... 179/5 P
[58] Field of Search ............... 179/5 P, 5 R; 340/500, 340/506

[56] References Cited

U.S. PATENT DOCUMENTS

| 2,086,087 | 7/1937 | Melton | 179/5 P |
|---|---|---|---|
| 3,617,640 | 11/1971 | Cichanowicz | 179/5 P |
| 3,868,479 | 2/1975 | Schweitzer et al. | 179/5 R |
| 3,925,622 | 12/1975 | Robinson | 179/6 D |
| 4,006,460 | 2/1977 | Hewitt et al. | 340/506 |
| 4,054,752 | 10/1977 | Dennis, Jr. et al. | 179/5 R |
| 4,065,642 | 12/1977 | McClure | 179/6 D |

Primary Examiner—Bernard Konick
Assistant Examiner—Joseph A. Popek

[57] ABSTRACT

The false alarm rate of security systems is reduced by utilizing information generated immediately prior to the activation of alarm means. This information is stored in recording means such as a magnetic tape recorder. The recorded information may be later transmitted to a remote site to help in judging the validity of an alarm.

10 Claims, 2 Drawing Figures

1

METHOD AND MEANS FOR REDUCING FALSE ALARM RATES IN SECURITY SYSTEMS

BACKGROUND OF THE INVENTION

This invention relates to security systems wherein an alarm warning is transmitted to a remote site indicating unauthorized activities at a protected location. The alarm can be activated by unexpected sounds, motion of bodies, weight on the floor, etc. The alarm information may be transmitted to the remote monitoring site by use of private dedicated lines, radio circuits, or by standard dial telephone circuits. If a dial telephone circuit is used, an automatic dialer is used and such devices are equipped with recording devices for transmitting a message stating the location of the place originating the alarm.

The main problem experienced with such systems is the large false alarm rate. It is comparatively easy to make certain that unauthorized entry to the protected area is detected but it is most difficult to avoid false operation of the alarms. For example, in the case of sonic activated alarms it is most difficult to differentiate between quiet unauthorized activities and dogs barking, thunder, horn blowing, etc. The problem has reached such serious proportions as to lead to the introduction of legislation to prohibit the use of alarm devices transmitting to police and fire department telephone systems.

Sophisticated systems analyzing sounds so as to better distinguish between true alarms and false alarms have been developed. For example, techniques such as disclosed in U.S. patent No. Re.27,202 can be used for such service. However, the variety of sounds that can falsely operate alarms is so great as to make such procedures inadequate.

SUMMARY OF THE INVENTION

Characteristic features and advantages of the present invention are realized by providing means for storing information concerning conditions that prevailed immediately before and during the instant that an alarm was activated. The availability of such information at the remote site monitoring the alarms can be most useful in making a determination as to the validity of the alarms and thereby materially reduce the number of false alarms. It is also possible to, by use of this invention, economically provide sophisticated devices at a monitoring site serving a multiplicity of protected locations and determine if the alarm is true.

A further advantage of this invention is that it allows the alarms to be set to a more sensitive point because the false alarm problem is greatly reduced by this invention.

A still further advantage of the invention is that less expensive alarm devices can be used as their false alarm sensitivity is made less important.

Additional features and advantages of this invention will be apparent from the following description and discussion of certain typical embodiments of the invention.

DESCRIPTION OF THE PREFERRED EMBODIMENTS

Figure 1:
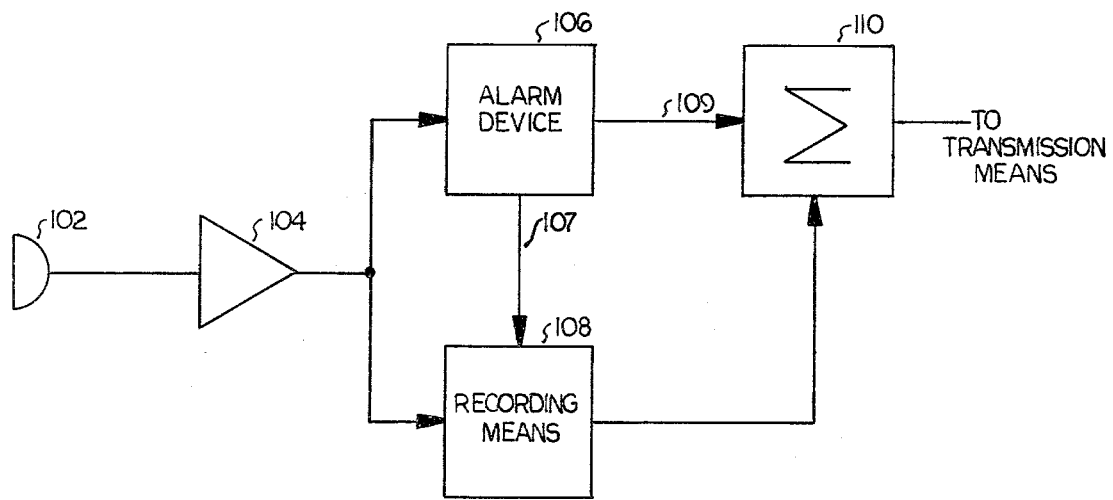
FIG. 1 is a simplified block diagram of equipment that may be installed at a protected location.

FIG. 1 is a block diagram of one embodiment of the invention. Transducer 102, which is one preferred arrangement would be a microphone, feeds a voltage to amplifier 104 which in turn feeds an alarm device 106. The alarm device will normally take the form of a simple threshold circuit but it also can utilize more sophisticated techniques to discriminate against ambient noise.

Whatever technique is used for sensing of unauthorized activities the output of alarm device 106, line 109, feeds a tone signal to summation circuit 110. This tone signal may be a single tone say at a frequency of 600 Hz or a two tone signal wherein the tones fall within 300 to 3,000 Hz; for example, 697 and 1209 Hz.

The output of amplifier 104 in addition to feeding the alarm device feeds the recording device 108. The recording device can take the form of an endless loop tape wherein the loop length is sufficiently long to store say, for example, 10 seconds of sounds. It can also take the form of a solid state memory. Although at the present time such devices, ineconomic packages, will provide appreciably less storage.

One type of solid state memory is the CCD-321 integrated circuit manufactured by Fairchild Semiconductor Corp., Mountainview, Ca. Ten of such devices provide approximately 1 second of delay for 3 kHz signals.

When the alarm device 106 operates in response to a disturbance, the alarm device causes a dc voltage to appear on line 107. This voltage controls recording means 108 to temporarily stop the erasing procedure so as to make certain that the information generated immediately preceding the time the alarm was activated is stored until it is played back for transmittal to the remote monitoring site. By this procedure personnel at the monitoring site can listen and evaluate the pre-alarm sounds.

Figure 2:
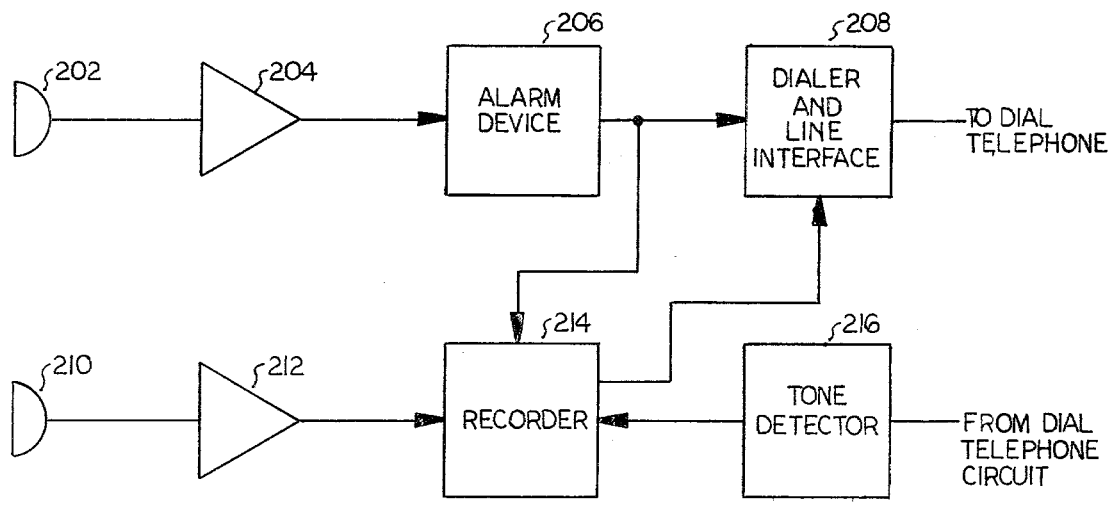
FIG. 2 is a simplified block diagram of a second form of equipment for use at the protected location especially suitable for use with a dial telephone circuit.

FIG. 2 is a simplified block diagram showing means for implimenting the invention with a dial telephone circuit. The output of transducer 202 feeds amplifier 204. This transducer may be of various types; including, sonic, stress, and ultrasonic. The output of amplifier 204 feeds alarm device 206 which is the same type as 106 of FIG. 1. Actually, all of the blocks in FIG. 1 can be used to perform corresponding functions in FIG. 2.

The alarm device 206 is then used to activate the automatic dialer part of block 208. Block 208 may incorporate a separate recording mechanism for playing back messages for providing information as to the location of the associated alarm equipment.

However, in some embodiments of the invention the recording means 214 will be used to perform the function of supplying the location information.

A separate transducer 210 is shown in FIG. 2 feeding amplifier 212. However, in many applications one transducer may be used both for operating the alarm and furnishing the signal information for recorder 214. One situation where two separate transducers would be required is where two different types of transducer systems are desired. For example, for some applications 202 transducer may be a stress type sensor and 212 may best take the form of a microphone.

FIG. 2 shows means for remotely controlling recording means 214. This feature, while not essential to the employment of the invention, allows a person monitoring the alarms to command playback of the pre-alarm information at his convenience rather than a predetermined schedule. The return signal from the monitoring site is fed to tone detector 216 which in turn controls recorder 214. The same tone detector system as described below in the discussion of block 304 of FIG. 3 may be used.

Another signal may be transmitted back to the recorder for restarting the record cycle so as to ready the recorder for the next alarm. For those applications of the system not requiring such flexibility, the system can be designed so that the playback of the recorded pre-alarm information can be arranged to automatically occur on completion of the transmission of the location information. In this case the system will revert to continuous recording on completion of the playback cycle so as to be ready for the next alarm.

Figure 3:
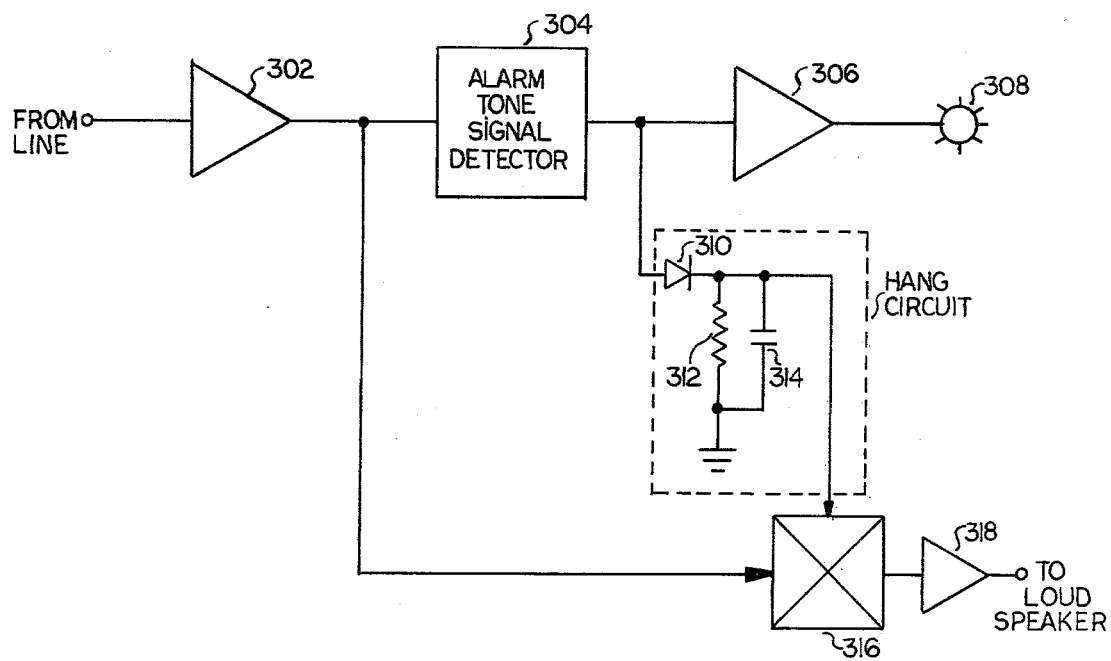
FIG. 3 is a simplified combination block and schematic drawing showing equipment suitable for use at the monitoring location and to be used in conjunction with the equipment shown in FIG. 1.

FIG. 3 shows one receiving unit that can be used at a remote site to receive the signal produced at the alarm site by the equipment shown in block form in FIG. 1. The tone signal generated in alarm device 106 of FIG. 1 upon activation of the alarm is amplified by amplifier 302. This amplified tone signal which may be, as mentioned above, a single tone or a two tone wave, is detected in alarm tone signal detector 304.

One type of tone detector that may be used for this application is a NE/SE567 tone decoder integrated circuit as manufactured by Signetics Corporation, Sunnyvale, California 94086. If the two-tone signal is used, two tone detectors are used in conjunction with an AND gate to detect the two tone alarm signal. Of course, for those locations where the transmission means between the protected site and the monitoring site is a pure wire system it may be practical to transmit a dc wave and eliminate the tone generating and detecting equipment.

The output of block 304 is amplified in amplifier 306 to a level sufficient to drive lamp 308. Lamp 308 should be located in a convenient spot for viewing by monitoring personnel. It is, of course, possible to utilize circuitry energizing an audible alarm in lieu of or in conjunction with the visual alarm.

The output of alarm tone signal detector 304 also feeds diode 310 which in turn feeds resistor 312 and capacitor 314. The three elements 310, 312, and 314 form a quick charge, slow decay circuit that provides a hang time effect. The hang time should be of sufficient length to allow time for listening to the identifying signal and the information regarding the sounds made immediately preceding and up to the time of the activation of the alarm. The hang circuit drives gate 316 which feeds amplifier 318 which in turn feeds a loud speaker.

Therefore, by use of this system, monitoring personnel are able to better judge the validity of the alarms and significantly reduce the number of false alarms. The output of amplifier 318 may be connected to a recorder so that the alarm information can be stored for later use.

The receiving equipment for the alarm system, shown in FIG. 2, may be simply a conventional telephone. If recorder 214 at the protected site is to be caused to operate to play back the pre-alarm recorded information a keyed tone source and means for coupling the output of the tone source to the telephone circuit must be installed at the monitoring site. Of course, the received signal may be recorded so that information may be used at a later time.

From the foregoing, further variations and applications of the invention will be apparent to those skilled in the art to which the invention is addressed, within the scope of the following claims.

What is claimed is:

1. A security system comprising;
   (a) a first transducer,
   (b) an alarm detector fed by the output of the transducer,
   (c) means for transmitting the alarm information to a remote site, including automatic dial equipment controlled by the alarm detector and connected to a telephone line, said transmitting means further including means to cause distant telephone receiving equipment to be activated and means for transmitting information as to the location of the (a) transducer,
   (d) a second transducer located in close proximity to the first transducer, and,
   (e) recording means fed by the second transducer, said recording means controlled to record sounds that occur at least for a period shortly before the alarm detector operates to the instant the alarm actually operates and which plays back said sounds to said remote site in response to the activation of said telephone receiving equipment for use in ascertaining the validity of the alarm.

2. The security system of claim 1 wherein the recording means incorporates an endless loop tape recorder.

3. The security system of claim 1 wherein the recording means is a semiconductor storage device.

4. The security system of claim 1 wherein the second transducer is a microphone.

5. A security system comprising;
   (a) a transducer for detecting unauthorized activity
   (b) alarm means connected to the transducer
   (c) transmission means for causing alarm information to be transmitted to a remote site,
   (d) recording means also connected to the (a) transducer means said recording means operating continuously at least until the alarm means is activated and of sufficient storage capacity to at least store information that was recorded shortly before the alarm was activated, and,
   (e) means for transmitting the recorded information to the remote site in response to the transmission of said alarm information so that the information is available for use in ascertaining the validity of the alarm.

6. The system of claim 5 wherein the transducer is a microphone.

7. The method of providing improved protection against unauthorized activities comprising;
   (a) sensing unusual activities,
   (b) recording information generated by physical disturbances which occur during a period including at least the period immediately prior to the instant when the (a) sensing step occurred,
   (c) causing the transmittal of a signal whenever the (a) sensing step occurs to a remote site, and,
   (d) making available the information recorded as per step (b) at the remote site in response to the transmittal of the signal as per step (c) so that the information is available for use in ascertaining any unauthorized activity.

8. The method of claim 7 including the step of automatically dialing after unusual activity is sensed so as to allow the use of dial telephone transmission circuits.

9. The method of claim 7 wherein the recorded information in step (b) can be remotely controlled in order to allow the recorded information to be played back on command.

10. The method of claim 7 wherein the sensing step utilizes a transducer and a threshold circuit.

* * * * *